United States Patent
Panzer

(10) Patent No.: US 6,792,839 B2
(45) Date of Patent: Sep. 21, 2004

(54) ROTATING SHEARING DEVICE AND METHOD FOR SEPARATING THE FRONT CROP AND REAR CROP FROM RUNNING ROLLING STOCK

(75) Inventor: Günter Panzer, Niederkrüchten (DE)

(73) Assignee: SMS Demag AG, Dusseldorf (DE)

( * ) Notice: Subject to any disclaimer, the term of this patent is extended or adjusted under 35 U.S.C. 154(b) by 128 days.

(21) Appl. No.: 09/991,857

(22) Filed: Nov. 14, 2001

(65) Prior Publication Data

US 2002/0073816 A1 Jun. 20, 2002

(30) Foreign Application Priority Data

Nov. 15, 2000 (DE) .......................................... 100 57 716

(51) Int. Cl.[7] .............................. B23D 19/04; B26D 3/16
(52) U.S. Cl. ............................... 83/37; 83/102; 83/288; 83/306; 83/444; 83/496
(58) Field of Search ......................... 83/105, 106, 102, 83/303, 306, 307, 343, 345, 288, 497, 479, 444, 496, 500, 34, 35, 36, 37; 72/203

(56) References Cited

U.S. PATENT DOCUMENTS

| | | | | |
|---|---|---|---|---|
| 2,701,016 A | * | 2/1955 | Bedson ......................... | 83/105 |
| 3,258,951 A | * | 7/1966 | Kinnicutt, Jr. et al. ........ | 72/203 |
| 3,491,640 A | * | 1/1970 | Poran .......................... | 83/306 |
| 3,727,498 A | * | 4/1973 | Poran .......................... | 83/106 |
| 3,760,670 A | * | 9/1973 | Poran .......................... | 83/102 |
| 4,080,859 A | * | 3/1978 | Polhall et al. ................ | 83/306 |
| 4,307,594 A | * | 12/1981 | Steinbock .................... | 72/201 |

FOREIGN PATENT DOCUMENTS

| | | | |
|---|---|---|---|
| DD | 145 237 | 9/1979 | |
| DE | 24 35 486 | 2/1976 | ........... B23D/19/04 |
| DE | 145 237 | 9/1979 | |

* cited by examiner

Primary Examiner—Allan N. Shoap
Assistant Examiner—Ghassem Alie

(57) ABSTRACT

A rotating shearing device for cropping fast-running rolling stock, in particular wire, includes two axially cutting annular knives which rotate about their axes at the same rotational speed. The two axially cutting annular knives include end cutting edges directed toward one another which converge to the clearance required for separating running stock during the cutting operation and lie in planes which are arranged at an acute angle to one another and intersect one another in a line. The rolling stock is guided toward the shearing device by a front guide and guided away from the shearing device by a rear guide. The front guide is pivotable to change in the relative position between the rolling stock and the cutting body so that the rolling stock may be guided either through the space between the annular knives which is free for the cut-free passage of the rolling stock or into the wedge-shaped cutting region of the annular knives. The rear guide part arranged behind the shearing device is also pivotable between a lower end and upper end position.

2 Claims, 1 Drawing Sheet

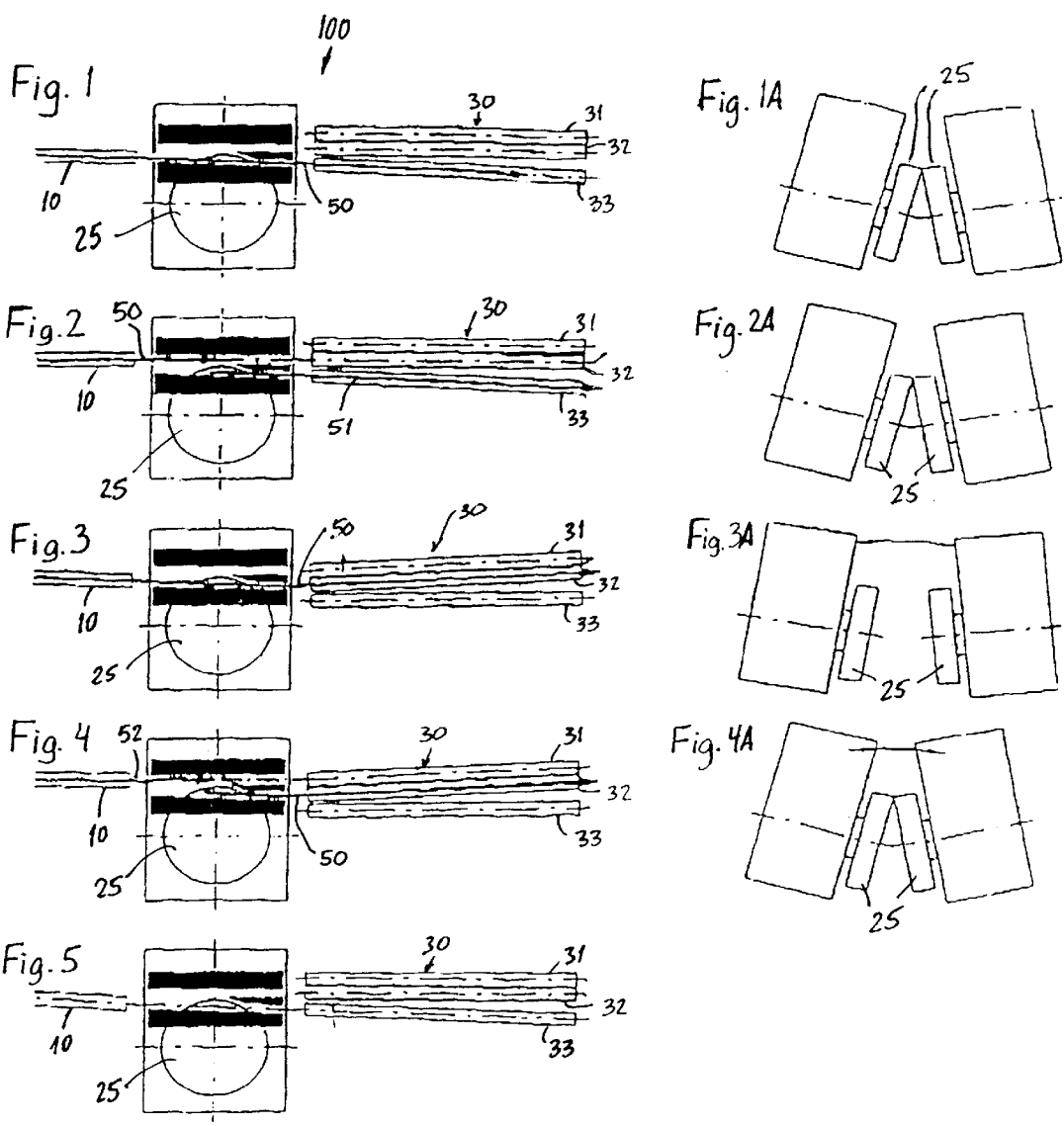

ROTATING SHEARING DEVICE AND METHOD FOR SEPARATING THE FRONT CROP AND REAR CROP FROM RUNNING ROLLING STOCK

BACKGROUND OF THE INVENTION

1. Field of the Invention

The present invention relates to a rotating shearing device for cropping fast-running rolling stock and to a method for separating the front crop and the rear crop from the running rolling stock by the rotating shearing device.

2. Description of the Related Art

A rotating shearing device of the generic type is described in U.S. Pat. No. 3,491,640.

A further shearing device of this type is shown in DE-A 24 35 486, which also shows the conventional overall plant which consists of two shearing devices arranged one behind the other. The front crop is separated from the rolling stock by the front or first shearing device. After the rolling stock is run through, the rear crop is then separated by the second shearing device. Each of the guides arranged in front of the shearing devices is mounted pivotably, that is to say the end of the guide facing the shearing device is capable of being raised and lowered in relation to the respective fixedly arranged shearing device. The rolling stock can therefore be brought into the cutting range of the annular knives, for this purpose the guide arranged in front of the shearing device being pivoted upward.

Fixedly positioned guides are provided behind the shearing devices for receiving the front crop and rear crop, respectively.

The necessary use of two shearing devices, with all the associated guides, drives and controls, gives rise to very high plant costs which then, of course, also entail high operating and maintenance costs. Furthermore, these plants require a large amount of space.

SUMMARY OF THE INVENTION

An object of the present invention is to provide a shearing device with lower costs and reduced space requirements.

The object is achieved by a rotating shearing device for cropping fast-running rolling stock, in particular wire, with two axially cutting annular knives which rotate about their axes at the same rotational speed. The two axially cutting annular knives include end cutting edges directed toward one another which converge to the clearance required for separating the running stock during the cutting operation and lie in planes which are arranged at an acute angle to one another and intersect one another in a line. The rolling stock is guided toward the shearing device by a front guide and guided away from the shearing device by a rear guide. The front guide is pivotable to change the relative position between the rolling stock and the cutting body so that the rolling stock may be guided either through the space between the annular knives which is free for the cut-free passage of the rolling stock or into the wedge-shaped cutting region of the annular knives. The rear guide part arranged behind the shearing device is also pivotable between a lower end and upper end position.

According to the present invention, only one shearing device is used which carries out the separation of both the front crop and the rear crop. A front guide part and a rear guide part interact by different configurations depending on which part of the running stock, i.e., the front crop or the rear part, is being separated and correspondingly conveyed away. Furthermore, the respective positions of the annular knives in relation to one another also depends on which part of the running stop is to be separated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 1 is a schematic view of the shearing device according to the present invention at an initial position;

FIG. 1A is a view of annular blades of the device of FIG. 1 from a direction of movement of the rolling stock;

FIG. 2 is a schematic view of the shearing device of FIG. 1 at a position in which the first crop is cut;

FIG. 2A is a view of annular blades of the device of FIG. 2 from a direction of movement of the rolling stock;

FIG. 3 is a schematic view of the shearing device of FIG. 1 at a position in which the running stock is run through the device;

FIG. 3A is a view of annular blades of the device of FIG. 3 from a direction of movement of the rolling stock;

FIG. 4 is a schematic view of the shearing device of FIG. 1 at a position in which the rear crop is searated from the running stock;

FIG. 4A is a view of annular blades of the device of FIG. 4 from a direction of movement of the rolling stock; and FIG. 5 is a schematic view of the shearing device of FIG. 1 after the front and rear guides of the shearing device are moved back to the initial position.

DETAILED DESCRIPTION OF THE PRESENTLY PREFERRED EMBODIMENTS

FIG. 1 shows a shearing device 100 according to an embodiment of the present invention at the start of the run-through of the rolling-stock 50 in the free space between annular knives 25. FIG. 1a shows the positions of the annular knives 25 in the cutting position. In this initial position, a front guide part 10 of the shearing device 100 is in a lower position and a rear guide part 30 of the shearing device 100 is in its upper end position. To separate a front crop 51 from the running stock 50, the front guide part 10 is pivoted upward. Since the annular knives 25 are in the cutting position, separation occurs and the cut-off front crop 51 passes into a lower guide 33 of the rear guide part 30 as depicted in FIGS. 2 and 2A. After separation of the front crop 51, the rolling stock 50 continues running above the annular knives 25 and through a middle guide 32 of the rear guide part 30. During further run-through of the rolling stock 50, the annular knives 25 are opened as shown in FIG. 3A and the front guide part 10 and rear guide part 30 are pivoted synchronously downward to the position shown in FIG. 3.

The annular knives 25 are then closed, such that the annular knives 25 come into the cutting position again as shown in FIG. 4A. To separate the rear crop 52 as shown in FIG. 4, the front guide part 10 is pivoted upward. The rear crop 52 is then led through the upper guide 31 of the rear guide part 30.

After the rear crop is separated, the front guide part 10 is pivoted downward and rear guide part 30 is pivoted upward as shown in FIG. 5 so that the initial position shown in FIG. 1 is reached again.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method for separating a front crop and a rear crop from a running rolling stock using a rotating shearing device, wherein the shearing device includes two axially cutting annular knives mounted for rotation about respective axes at the same rotational speed, each of said two annular knives having end cutting edges directed toward one another and converging at a cutting position to a clearance necessary to separate the rolling stock, the two annular knives arranged at an acute angle to one another and intersecting one another along a line, a front guide arranged for guiding the rolling stock to the annular knives, the front guide being switchable between an upper end position and a lower end position, and a rear guide arranged for guiding the rolling stock from the annular knives, the rear guide having lower, middle, and upper rear guide parts, said method comprising the steps of:

introducing a start of a running rolling stock into the free space between the annular knives by the front guide part in an initial state of the shearing device in which the front guide part is in the lower end position, the annular knives are in the cutting position and the rear guide part is in the upper end position;

pivoting the front guide part upward for separating the front crop with the annular cutting knives and discharging the front crop part into the lower rear guide part;

running the rolling stock through the rotating shearing device above the annular knives into the middle rear guide part after separating the front crop;

opening the annular knives and synchronously pivoting the front guide part into the lower end position and the rear guide into the lower end position during the further run-through of the rolling stock;

closing the annular knives into the cutting position and pivoting the front guide part upward after the annular knives are in the cutting position for separating the rear crop with the annular knives and discharging the rear crop through the upper rear guide part; and pivoting the front guide part into the lower end position and the rear guide part into the upper end position for establishing the initial state.

2. A rotating shearing device for cropping fast-running rolling stock, comprising:

two axially cutting annular knives mounted for rotation about respective axes at the same rotational speed, each of said two annular knives having end cutting edges directed toward one another, said cutting edges converging at a cutting position to a clearance necessary to separate the rolling stock, said two annular knives arranged at an acute angle to one another and intersecting one another along a line;

a front guide arranged for guiding the rolling stock to said annular knives, said front guide being switchable between an upper end position in which the rolling stock is capable of being guided tangentially to the annular knives and a lower end position in which the rolling stock is capable of being guided through the free space between the annular knives; and a rear guide arranged for guiding the rolling stock from said annular knives, said rear guide having three rear guide parts, wherein said rear guide is pivotable for raising and lowering the rear guide so that each of a front crop of the running stock, a rear crop of the running stock and the running-off rolling stock are selectively received in one of the three rear guide parts, said rear guide part being pivotable in coordination with said front guide part.

* * * * *